(12) United States Patent
Watson

(10) Patent No.: US 10,364,587 B2
(45) Date of Patent: Jul. 30, 2019

(54) EMERGENCY SHELTER

(71) Applicant: Extremis Technology Ltd, Norfolk (GB)

(72) Inventor: David Maurice Watson, Lowestoft (GB)

(73) Assignee: Extremis Technology Ltd., Norfolk (GB)

( * ) Notice: Subject to any disclaimer, the term of this patent is extended or adjusted under 35 U.S.C. 154(b) by 0 days.

(21) Appl. No.: 15/035,066

(22) PCT Filed: Oct. 31, 2014

(86) PCT No.: PCT/EP2014/073465
§ 371 (c)(1),
(2) Date: May 6, 2016

(87) PCT Pub. No.: WO2015/067537
PCT Pub. Date: May 14, 2015

(65) Prior Publication Data
US 2016/0265244 A1    Sep. 15, 2016

(30) Foreign Application Priority Data

Nov. 6, 2013 (GB) .................................. 1319629.0
Nov. 7, 2013 (GB) .................................. 1319701.7

(51) Int. Cl.
| E04B 1/344 | (2006.01) |
| E04H 9/14 | (2006.01) |
| E04B 1/343 | (2006.01) |
| E04H 1/12 | (2006.01) |
| E04H 1/00 | (2006.01) |

(52) U.S. Cl.
CPC ............... *E04H 9/14* (2013.01); *E04B 1/344* (2013.01); *E04B 1/3445* (2013.01); *E04B 1/34357* (2013.01); *E04B 1/34373* (2013.01); *E04H 1/005* (2013.01); *E04H 1/1205* (2013.01); *E04B 2001/34389* (2013.01); *Y02A 50/14* (2018.01)

(58) Field of Classification Search
CPC .......... B60P 3/34; E04B 1/3442; E04B 1/343; E04B 2001/0069; E04B 1/34336; E04B 1/3445; E04B 1/34357; E04B 1/34384; E04H 9/14
See application file for complete search history.

(56) References Cited

U.S. PATENT DOCUMENTS

| 2,832,637 | A | * | 4/1958 | Decosse | B60P 3/34 |
| | | | | | 296/26.15 |
| 2,883,713 | A | * | 4/1959 | Zug | E04B 1/3445 |
| | | | | | 52/264 |
| 3,302,341 | A | * | 2/1967 | Konopasek | B60P 3/34 |
| | | | | | 296/173 |
| 3,460,297 | A | * | 8/1969 | Fritz | E04B 1/3442 |
| | | | | | 296/173 |

(Continued)

*Primary Examiner* — Gisele D Ford
(74) *Attorney, Agent, or Firm* — Brooks Kushman P.C.

(57) ABSTRACT

A rapidly deployable building adaptable between a first normal configuration and a second wind-resistant configuration by relative movement of at least two space enclosing elements of the building provides readily assembled, cost-effective but robust shelters to disaster zones capable of withstanding severe weather events such as hurricanes.

16 Claims, 6 Drawing Sheets

(56) References Cited

U.S. PATENT DOCUMENTS

| | | | | |
|---|---|---|---|---|
| 3,653,165 | A | * | 4/1972 | West .................... E04B 1/3442 52/121 |
| 3,667,800 | A | * | 6/1972 | Cuthbert ............... E04B 1/3442 296/173 |
| 3,998,013 | A | * | 12/1976 | Barnett ............... E04B 1/34336 52/66 |
| 4,955,174 | A | * | 9/1990 | Valente ............... E04G 23/0266 52/745.05 |
| 5,493,818 | A | * | 2/1996 | Wilson ................. E04B 1/3445 52/71 |
| 6,151,841 | A | * | 11/2000 | Green ...................... E04H 9/14 109/1 S |
| 2013/0019913 | A1 | * | 1/2013 | Zadok .................. E04B 1/3442 135/96 |
| 2014/0033619 | A1 | * | 2/2014 | Merchant ........... E04B 1/34357 52/71 |

* cited by examiner

EMERGENCY SHELTER

FIELD OF THE INVENTION

This invention pertains generally to the field of shelters for withstanding extreme conditions and especially to emergency relief shelters which are capable of withstanding extreme conditions and to kits and methods of manufacture thereof.

BACKGROUND OF THE INVENTION

Many buildings and especially temporary shelters in areas of recovery from natural disasters, such as hurricanes, are vulnerable to severe weather such as further hurricanes. Whilst temporary accommodation in the form of tents is often provided, the stay often extends for longer than would have been ideal and thus the likelihood of a further devastating event increases.

There is a need for an improved building structure that has improved weather resistance.

US-A-2006/010729 describes a building for transportation which is adjustable between a relatively compact transportable configuration and an extended usable configuration. This is not a flat-packed system but is sized to fit onto a trailer, typically. Thus, the building in its extended configuration comprises a base unit having a 'back' wall and two side walls and extending from each of the side walls an extended portion comprising two hinged, foldable sidewall leafs the distal edge of which adjoin a front wall. An apex roof, hinged to the back wall, covers the base unit and the first of the two hinged sidewall leafs, while a flat roof covers the outer extended portion. It may be moved to its compact form by folding the sidewall leafs inward whilst the front wall is moved toward the back wall. The roof for the extended portion moves inside the building. When the front wall is adjacent the base unit, the apex roof may pivot down so that one side of the roof is flat on the top of the base unit and the other side of the roof is flat adjacent the front wall. It is mentioned that a floor may comprise a pivot arrangements similar to the walls and thus pivot as the front wall moves toward the back wall. It is not apparent how this can be achieved. The building in this case is not intended to be occupied in its compact configuration and access is not apparent. In its compact configuration, the building has a cuboid profile which is not particularly deflective of wind or wind-carried ballistics.

GB-A-2078274 describes a building having a main structure with its own walls, windows and roof and a secondary roof structure which is pivotally mounted to the at least a portion of one wall and may be swung out and supported by posts, moved to form the roof of a verandah or retracted to a vertical position adjacent the wall, e.g. for protection in a cyclone. Secondary roof structures may be provided around the building.

US-A-2012/0180404 describes a building that is formed of hingedly interconnected components so that it can be supplied in a flat-packed arrangement and constructed with relative simplicity. Several configurations are described. However, a central or medial support element/partition is not described. Whilst it states that the building may be constructed for hurricane resistance, there is not provided normal and wind-resistant configurations.

US-A-2008/0141596 describes a system for modification of a building to reduce its stress from strong winds. According to the system, long trapezium and/or triangular-shaped windproof panels, made for example by fibrous materials such as recycled carpets, may be affixed at one side to anchoring devices buried in the ground at positions around the exterior of the building and then may be affixed to or leaned against the eaves of the building to form a pyramid-like structure capped by the roof of the house. Thus a reinforced structure is produced which better deflects wind. Such a system adds considerably to the footprint of the building, requires infrastructure by way of anchoring devices used only for this purpose and storage of the substantial panel elements between storms.

The present inventor has developed a building and building system that overcomes shortcomings of the prior art.

Problem to be Solved by the Invention

There is a need for improvements in buildings and building systems and their resistance to severe weather events such as hurricanes.

There is a need for improved rapidly deployable temporary or semi-temporary shelters.

SUMMARY OF THE INVENTION

In accordance with a first aspect of the invention, there is provided a building that is adaptable between a first normal configuration and a second wind-resistant, especially hurricane-safe, configuration. Preferably, the building is adaptable by relative movement of at least two space enclosing elements of the building.

In a second aspect of the invention, there is provided a transportable building system (e.g. in the form of a structural kit) comprising a plurality of wall, roof and floor panel elements which may be assembled from a compact, collapsed form to an assembled deployed form and in its deployed form is adaptable between a first normal configuration and a second wind-resistant (e.g. hurricane-safe) configuration.

In a third aspect of the invention, there is provided a transportable building system (e.g. in the form of a structural kit) having a collapsed, compact form for transport and an assembled, deployed form, wherein the compact form comprises a self-supporting or rigid supporting panel element and a plurality of roof, wall and floor panel elements and wherein the deployed form comprises a rigid support panel element disposed medially in the building and extending either side therefrom first and second floor elements, first and second roof elements, first and second sets of gable wall elements and linked to one or both of a roof element or a floor element a first and second side wall element.

In a fourth aspect of the invention, there is provided a method for the manufacture of a building or building system as defined above In a fifth aspect of the invention, there is a provided a shipping container loaded with at least one transportable building system as defined above, preferably at least 5 and more preferably 7 to 10 (e.g. 9).

ADVANTAGES OF THE INVENTION

The building and system of the present invention enable rapid deployment of cost-effective yet robust temporary and semi-permanent building structures to disaster zones, which may be readily assembled and are capable of withstanding severe weather events such as hurricanes.

DETAILED DESCRIPTION OF THE INVENTION

The building according to the present invention is adaptable between a first normal configuration and a second wind-resistant configuration, preferably by relative movement of at least two space enclosing elements of the building.

Preferably, at least a portion of each of the at least two space enclosing elements of the building are space enclosing in at least the first configuration. Preferably, at least a portion of at least one of the space enclosing elements of the building is a space enclosing element of both the first and second configuration. More preferably, at least a portion of each of the at least two space enclosing elements, the relative movement of which facilitates the adaptation of the building between its first and second configurations are space enclosing elements in both the first and second configurations.

By space enclosing elements, it is meant elements at least a portion of which separate the interior of the building from the exterior of the building (as opposed to additional components that protrude from the building in one form, for example). Thus, an element of a building (e.g. a panel element) that acts as a space enclosing such as a roof element or a wall element may be considered a space enclosing element.

Preferably, the second configuration is a hurricane-safe configuration.

By wind-resistant configuration, it is meant at least that a suitably anchored building is more wind-resistant than in its first configuration and preferably it is meant that a suitably anchored building can withstand winds of 40 mph or more, more preferably of 60 mph or more.

By hurricane-safe, it is meant that a suitably anchored building can withstand winds of 75 mph or more (e.g. equivalent to a category one hurricane), more preferably 95 mph or more (e.g. equivalent to a category two hurricane), more preferably 110 mph or more (e.g. equivalent to a category three hurricane), more preferably 130 mph or more (e.g. equivalent to a category four hurricane), more preferably 155 mph or more (e.g. equivalent to a category five hurricane) and still more preferably 200 mph or more.

Preferably, the first configuration defines a first internal volume and the second configuration defines a second internal volume less than the first internal volume. Thus, preferably, the adaptation of a building to a weather resistant second configuration does not add volume to the building which may be valuable in normal use. That is, the building should be adapted to maximise its utility in the first configuration whilst providing emergency structural resistance in its second configuration.

By utilising existing space enclosing elements in forming the wind-resistant or storm resistant second configuration maximum use is obtained from the materials required for the building in normal day-to-day life. This is of particular benefit when the building is a relief shelter, where in certain environments wind or storm resistance is very important. It is not cost-effective to have built-in hurricane resistant structures to the relief shelters as it is only occasionally (albeit of huge importance) that such structural strength and resilience is required, whereas the priority in such circumstances is to house as many people as quickly and efficiently as possible. Preferably, therefore, the second configuration does not require any additional structural components beyond those used in the first configuration and preferably only space enclosing elements of the first configuration are required to be adapted for use in the second configuration.

Preferably, the first configuration comprises a first roof element moveable relative to at least one structurally supporting part of the building which first roof element in the first configuration has a first roof angle to the horizontal and in the second configuration at least a portion of an element derived from the first roof element of the first configuration has an angle to the horizontal of greater than the first roof angle.

Preferably, the first configuration comprises a first roof element moveable relative to at least one structurally supporting part of the building which first roof element in the first configuration has a first roof angle to the horizontal and an adjacent first side wall element at least a portion of which is moveable relative to at least one structurally supporting part of the building which first side wall element in the first configuration has a first side wall angle to the horizontal and wherein the second configuration comprises a composite roof-wall arrangement having a roof component derived from at least a portion of the first roof element and a side wall component derived from at least a portion of the first side wall element, the angle to the horizontal of the roof component and wall component of the composite roof-wall arrangement being intermediate between the first roof angle and the first wall angle.

Preferably, the first roof angle is in the range 0 to 30 degrees from the horizontal, preferably 5 to 20 degrees (e.g. 5 to 10 degrees).

Preferably, the first wall angle is in the range 60 to 90 degrees from the horizontal, preferably at least 75 degrees, more preferably at least 80 degrees, still more preferably at least 85 degrees and most preferably about 90 degrees.

Preferably, the angle to the horizontal of each of the roof component and wall component of the composite roof-wall arrangement is independently in the range 30 to 60 degrees from the horizontal, preferably 40 to 50 degrees, more preferably 42 to 48 degrees and most preferably about 45 degrees and most preferably the angle to the horizontal of the roof component and the wall component is substantially the same.

A composite roof-wall arrangement as used herein in accordance with a preferred embodiment is any structure in a second configuration which is an adaptation of the building of the first configuration and utilises at least a portion of a roof of the first configuration adapted for use in the second configuration and at least a portion of a wall of the first configuration adapted for use in the second configuration.

Preferably, the internal floor space of the building in the second configuration is at least 75% of the internal floor space in the first configuration, more preferably at least 80%, still more preferably at least 90% and most preferably there is no reduction in internal floor space in the second configuration compared with the first configuration. Preferably, also, there is no increase in the internal floor space by adopting the second configuration.

Preferably, the footprint of the building in the second configuration is not more than 20% greater than in the first configuration, preferably not more than 10% greater and most preferably is no greater than the first configuration. By footprint, it is meant the total amount of ground space the building is required to occupy. Maximising utility of the building footprint is beneficial when useable land for temporary housing may be in short supply.

Preferably, the relative movement of a first roof element and a first side wall element is facilitated by hinged mounting of the first roof element and/or the first side wall element on the building.

The building according to this aspect of the present invention may be of any suitable shape or style, the principles of the adaptation being applicable to a broad range of possible buildings. The invention finds particular application with simpler buildings structures, however, especially when intended for use as disaster or emergency relief structures. Preferably, the building is of quadrangular plan, typically square or rectangular. Optionally, the building has a sloping or angled roof and adopts a 'lean-to' configuration comprising a back wall (being a structurally supporting element) to which a roof element may be hingedly mounted and associated end (gable) and front walls, wherein the roof element and end and front walls may be adapted to take on a second configuration, e.g. having a composite roof-wall arrangement derived from a roof element and a front wall element of the first configuration.

Preferably, the building comprises an apex (or ridged) roof. Roof panels or elements preferably extend, typically sloping downward away from the apex, from each side thereof.

Preferably a first roof element is hingedly mounted at an upper edge thereof (e.g. at the apex) and a first wall element is hingedly mounted at a lower edge thereof whereby, subject to the reconfiguration of associated structural elements (e.g. end or gable walls), the first roof element and first wall element may pivot toward one another. Thus, a second configuration may be adopted in which the first roof and wall elements are arranged so that the second configuration has improved wind resistance. This may be by forming a composite roof-wall arrangement, which typically comprises a sloping element comprising at least a portion of at least one, but preferably both, of the first roof and wall elements. Optionally, the composite roof-wall arrangement is angular (i.e. it has two angles of incline separated by a ridge), but preferably, the roof-wall arrangement is planar configuration having a single angle of inclination.

Any suitable arrangement of building may be adopted in which the first and second configurations may be achieved. In one example, the building is has a triangular profile (i.e. with quadrangular plan, being a triangular prism) with an apex roof, having a roof element sloping downward away from each side of the apex roof to meet the floor, at an angle of, for example, 45 degrees. Formed in one or both sloping roof elements may be a dormer structure, typically being a box or sloping or flat-roof dormer structure having the function of increasing usable space inside the building. The dormer may comprises a dormer roof, hingedly mounted at its edge nearest the apex, and a dormer front, hingedly mounted at its edge nearest the floor and cooperating dormer sides, which are configured to move to facilitate the second configuration. By removing the dormer sides (or folding them out of the way), the dormer front and dormer roof may be pivoted toward one another. Thus a composite roof-wall arrangement may be achieved.

In another example, the building has a more typical pentagonal profile (e.g. floor, walls perpendicular to the floor and an apex roof on top) with an apex roof having roof elements extending from either side thereof sloping down to rest on a side wall (and flanked by gable walls). The roof element (e.g. a roof panel) may be hingedly mounted at the apex and the corresponding side wall may be hingedly mounted (e.g. to the floor—at a side wall-floor junction). By moving or adjusting cooperating gable end walls, the roof element and side wall elements may pivot toward one another. Thus a composite roof-wall arrangement may be achieved.

There are various configurations by which a first roof element and a first wall element may cooperate to form a composite roof-wall arrangement. Where the object is to tend toward a composite roof-wall arrangement of substantially consistent angle of inclination, there includes a number of possible arrangements, for example: the first roof element overlaps the outside of the first side wall element; the first side wall element overlaps the outside of the roof element [in either case, the roof and/or wall element may be configured, e.g. with a recess or joggle, to flushly accommodate the other]; one or both of the first roof element and first side wall element may be provided with a hinged distal portion (e.g. an upper portion of the side wall element may be hinged to a lower portion of the side wall portion and/or an outer portion of the roof element may be hinged to an inner portion) whereby one or other or both distal portions may be folded out of the way to enable the remaining roof and wall portions to cooperate, e.g. abut to form the composite arrangement; or optionally a first roof element may be hingedly mounted to the first wall portion itself hingedly mounted to the floor and each of the roof element and wall element comprises a hinged distal portion (i.e. distal from the apex and floor respectively), whereby the hinged distal portions (hingedly connected to one another) may be folded toward the interior of the building and the remaining roof and wall portions brought together at an intermediate angle to form a composite roof-wall arrangement.

Preferably, the building is a quadrangular plan building having a medial support element and an apex roof, which apex is supported or provided by a rigid or self-supporting medial support element, which preferably also forms part of or is configured in relation to a floor of the building. Preferably, the medial support element is centrally positioned.

Preferably, the building comprises a first roof element hingedly mounted to or in association with the apex of the apex roof and a first side wall element that is hingedly mounted to the floor. Preferably, a medial support element supporting the apex and the roof has two roof panel elements extending either side therefrom, each of which is preferably hingedly mounted to or in relation to the apex or medial support element.

Preferably, the first side wall element comprises a lower side wall element that is hingedly mounted to the floor and an upper side wall element that is hingedly mounted to the lower side wall element and is configured to be able to fold into the interior of the building, whilst the lower side wall element may fold inward toward the interior of the building so as to form a composite roof-wall element comprising the lower side wall element and the roof element.

Preferably, the building comprises a quadrangular plan, and in the first configuration a floor, an apex roof, two opposing gable wall arrangements, two opposing side wall arrangements and rigid medial support element extending from gable to gable and supporting the apex roof.

Preferably, each of the apex roof, floor, gable wall arrangements, side wall arrangements comprises one or more panel elements.

Preferably, the medial support element, preferably a central support element, comprises a partition wall to define two accommodation units within the building, which partition wall is optionally provided with a connecting opening or door. Preferably the medial support element has an I-profile, the central extended portion being the planar panel element providing the partition wall, the upper transverse portion providing or supporting the apex or ridge of the roof and the lower transvers portion providing a central floor portion.

Preferably, the building comprises:
- an apex roof comprises a ridge defining the apex which is substantially parallel with the side walls and supported by the medial support element;
- two roof panels each hingedly mounted to and extending from each respective side of the ridge to rest interoperatively with the side walls;
- each side wall comprises a lower side wall element hingedly mounted to the floor and an upper side wall element hingedly mounted to the lower side wall element;
- each gable wall arrangement comprises an inner portion disposed between the medial support element and the floor and defining an intermediate angle therebetween and an extended leaf portion hingedly or removably mounted to the inner portion and disposed between the roof panel and the side wall; and
- the building may be adapted from its first to its second configuration by disengaging the roof panel from the upper side wall element, folding away or removing the extended leaf portion of the gable wall arrangement, folding into the interior of the building the upper side wall element to abut the floor or other retention means so as to form a truss, pivoting toward the interior of the building the lower side wall element about its hinged mount to define the intermediate angle and pivoting the roof panel about its hinged mount inward toward the interior of the building so as to adopt the intermediate angle and engage or abut interoperatively with the lower side wall element to form a composite roof-wall element and securing in position.

Typically windows may be provided in a building, e.g. in a fold-away upper portion of the side wall panel. Thus, in a preferred embodiment, the windows may be removed from exposure in the wind-resistant configuration.

Preferably, the building has an internal floor area of up to 50 m², preferably in the range 12 to 25 m² and more preferably in the range 16 to 20 m² and most preferably about 16 m².

In a particularly preferred embodiment, the building may be provided in a compact (e.g. flat-packed) form and optionally may take the compact (flat-packed) form for transport and/or storage. Such a compact form is preferably as described below which also forms another aspect of the invention.

As mentioned above, in another aspect (and preferred embodiment of the first aspect), a transportable building system has a collapsed, compact form for transport and an assembled, deployed form, wherein the compact form comprises a self-supporting or rigid supporting panel element and a plurality of roof, wall and floor panel elements and wherein the deployed form comprises a rigid support panel element disposed medially in the building and extending either side therefrom first and second floor elements, first and second roof elements, first and second sets of gable wall elements and linked to one or both of a roof element or a floor element a first and second side wall element. Preferably, two or more panel elements are interconnected by hinge arrangements.

Preferably, the compact form comprises at least the supporting panel element, which is preferably an I-profile panel element, and two floor panel elements, two roof panel elements, four gable wall panel element arrangements and two side wall panel elements. Preferably, the panel elements are sized so that the I-profile is the largest single panel element and the remaining panel elements may be stacked in a parallel arrangement.

Preferably, the compact transportable form has cumulative dimensions of up to 8 meters in length (preferably up to 5 m and preferably about 4 m), up to 4 meters in height (preferably up to 3 m and more preferably up to about 2.5 m) and up to 2 m in width (preferably up to 1.5 m in width, more preferably up to 1 m and still more preferably up to 0.75 m in width). In a particularly preferred embodiment the compact transportable form is up to 4.5 m (preferably 4 m) long, up to 2.5 m (preferably 2.25 m) high and up to 1 m (preferably 0.75 m) wide.

Preferably the compact form comprises hinged to the structural panel element (which is preferably a planar panel element of I-profile) two floor panel elements extending from the base of the structural panel element two roof panel elements extending from the apex of the structural panel element. Preferably, four gable end panels are provided, preferably hingedly mounted, two at each end of the structural panel element and configured to flank the pairs of extending floor and roof panels. Two side-wall panel elements may preferably be provided for positioning between the distal portions (distal from the structural panel element) of the floor and roof panel elements. The side wall panel elements may, independently, optionally be hingedly mounted to the floor panel element (at a side wall-floor junction) or the roof panel element (at a side wall-roof junction) or, the side wall panel elements may each comprise two separate panel components (an upper and a lower wall panel component) which optionally are mounted (optionally hingedly) to respective roof and floor panel elements.

Each panel element as described herein may, independently, optionally be formed as a unitary element or of multiple components which may optionally be provided separately, joined or arranged together, hingedly mounted to one another or simply configured for transport in cooperation.

Preferably the compact form comprises a single multi-hinged multi-panel arrangement capable of being arranged to form a building in the assembled form.

The panel components of the preferably have the following dimensions:
- A structural panel element, for medial location in the building (which is preferably a planar panel element of I-profile) of up 8 m length (end to end), preferably up to 5 m, more preferably up to 4.5 m and ideally about 4 m in length and up to 4 m in height, preferably up to 3 m and more preferably up to about 2.5 m [e.g. 4 m by 2.25 m]
- A floor panel element (of rectangular shape) for extending outward from the structural panel element of up to 8 m length (i.e. corresponding to the longitudinal direction of the structural panel element), preferably up to 5 m, more preferably up to 4.5 m and ideally about 4 m in length and up to 4 m in width (i.e. corresponding the extend transverse from the structural panel element in the assembled form), preferably up to 3 m and more preferably up to about 2 m and ideally about 1.8 m [e.g. 4 m by 1.8 m];

A roof panel element (of rectangular shape) for extending outward from the structural panel element of up to 8 m length (i.e. corresponding to the longitudinal direction of the structural panel element), preferably up to 5 m, more preferably up to 4.5 m and ideally about 4 m in length and up to 4 m in width (i.e. corresponding the extend transverse from the structural panel element in the assembled form), preferably up to 3 m and more preferably up to about 2 m and ideally about 1.9 m [e.g. 4 m by 1.9 m];

A gable panel element (of irregular quadrangle shape, to accommodate the sloping roof) of up to 4 m width (i.e. corresponding to the extent transverse from the structural panel element in the assembled form), preferably up to 2.5 m, more preferably up to 2.25 m and ideally about 2 m in width and up to 4 m in maximum height, preferably up to 3 m and more preferably up to about 2.5 m and ideally about 2 m [e.g. 2 m by 1.9 m];

Preferably, the gable panel element comprises two panel components, an inner panel component (of generally triangular shape) for assembly adjacent the structural panel element and the floor panel element and having a height and width as defined above with an hypotenuse calculated therefrom, preferably about 2.7 m and an outer panel component (of generally triangular shape) for disposing adjacent the roof panel element and side wall panel element and preferably hingedly mounted (or removably mounted) to the inner panel element; and A side wall panel element A roof panel element (of rectangular shape) for extending outward from the structural panel element of up to 8 m length (i.e. corresponding to the longitudinal direction of the structural panel element), preferably up to 5 m, more preferably up to 4.5 m and ideally about 4 m in length and up to 4 m in width (i.e. corresponding the extend transverse from the structural panel element in the assembled form), preferably up to 3 m and more preferably up to about 2 m and ideally about 1.9 m [e.g. 4 m by 1.9 m];

Preferably the side wall panel element comprises a lower side wall component having a length as defined above and reduced height (approximately half height or marginally less, preferably 0.85 m) and an upper side wall component having a length as defined above and a reduced height (approximately half or marginally more, preferably 0.86 m), preferably the upper and lower components are hingedly mounted so that in the assembled configuration, the upper component may pivot into the building (and act as a strut for the resulting composite roof-wall arrangement);

Preferably the upper side wall element has a shorter length, by way of a shortening at each end to enable it to pivot inward toward the building and fit between the gable wall panel elements;

Preferably the upper side wall component is provided with one or more (e.g. two, three or four) windows or window apertures, preferably three windows preferably having a height of up to 1m, preferably 0.75 m and preferably 0.6 m and a width of up to 1.5 m, preferably up to 1 m and preferably 0.75 m;

Preferably, the compact form comprises an arrangement of parallel panel elements.

Preferably the system comprises:

a longitudinally extended I-shaped profile rigid medial support panel element comprising a ridge element at an upper edge and at an opposing lower edge a central floor element and therebetween a substantially planar panel for forming a partition wall and defining gable edges at either end, the gable edges extending perpendicularly between both the ridge element and the central floor element;

extending from each side of the medial support element a floor panel hingedly mounted to the central floor element and moveable about the hinge mount between planes perpendicular to the medial support panel element and parallel to the medial support panel element;

extending from each side of the medial support element a roof panel hingedly mounted to the ridge element and moveable about the hinge mount between planes transverse to the medial support panel element and parallel with the medial support panel element;

extending from each side of the medial support element and hingedly mounted on each gable edge, two gable wall panels moveable about the hinge mount between a plane perpendicular to the medial support panel element and parallel with the medial support panel element; and extending from the an edge of each of the floor panels, distal to the medial support panel element and hingedly mounted to the floor panels a side wall panel moveable about the hinged mount between a plane parallel to the floor panels and transverse (preferably perpendicular) to the floor panels.

To facilitate hinging, the edges of certain components may require to have notches formed therein or to be tapered (so as to avoid jamming). For example, the roof panel hinged at a roof apex may need to be tapered (e.g. at 45 degrees).

At least one gable panel is preferably provided with an external door or doorway, where applicable in the inner component, preferably having a maximum height of 1.5 to 1.75 m (pref. 1.6 m) and a width of 0.5 to 0.75 m (esp 0.6 m).

The self-supporting / rigid medial, preferably central, I-shaped profile structural support panel element preferably comprises a planar panel element having along the long edges T-shaped components respectively providing the apex and a central portion of the floor. The structural support panel element preferably provides a partition wall within the building, whereby the building may provide two separate accommodation units or interconnected accommodation unites by the provision of an opening between them formed in the partition wall. The central floor portion preferably has a width of up to 1 m, preferably up to 0.5 m and the apex/ridge preferably has a width of up to 1 me, preferably up to 0.5 m, more preferably up to 0.35 m.

As mentioned above, in another aspect there is a transportable building system comprising a plurality of wall, roof and floor panel elements having a collapsed, compact form which may be assembled to an assembled deployed form and in its deployed form is adaptable between a first normal configuration and a second wind-resistant configuration.

Preferably, the system in its deployed form is a building as defined above.

Preferably the system comprises the further features of a system defined above.

Preferably, the second configuration has same internal floor space as first configuration Preferably, the building is adaptable by movement of at least a portion of an enclosing part of a roof and at least a portion of an enclosing part of a wall Preferably there is definable an apex to side wall-floor junction peripheral distance. In the first configuration, the first peripheral distance is the width of the roof panel plus the height of the side wall. In the second configuration, the second peripheral distance is less than the first peripheral distance.

In the second configuration the angle of the element of the roof panel making up the second configuration (composite roof-wall arrangement) is intermediate between the wall angle (i.e. degrees from horizontal) and the roof angle (degrees from horizontal).

Optionally, the roof and wall in its second configuration are overlapping but preferably are abutting.

Preferably, in the first configuration, the side walls are preferably substantially vertical extending from a side wall-floor junction to meet a roof element. And preferably, the second configuration comprises at least a portion of the wall and at least a portion of the roof form an enclosing element of reduced length from apex to wall/floor junction and/or of intermediate angle.

Any suitable material may be used for the building, building system or each of its components. The panels may be made, for example, from one or a combination of wood, plywood, chipboard (e.g. laminated), fibreboard (e.g. MDF), metal (e.g. steel, aluminium), plastic (e.g. recycled plastic—for example sheet materials of recycled plastic particles such as that obtainable by the processes defined in WO2013/038177 and available as Ecosheet™ from 2K Manufacturing Ltd of the UK—www.ecosheet.co.uk), composite materials such as fibre reinforced polymers (e.g. comprising glass fibre, basalt fibre, carbon fibre or natural fibres in multi-layer arrangements, for example formed by putrusion, with a suitable resin) or composite panel elements comprising sheet elements bonded to an insulating core.

Preferably, the panels are 'self supporting' or 'rigid' [i.e. not canvas or the like].

In one particularly preferred embodiment, the panels and components are manufactured largely from Ecosheet™.

In another particularly preferred embodiment, the panels, components, and/or building are made primarily of plywood and/or wood.

Typically, the elements and components utilised in the invention are panel elements. In one embodiment, theres are substantially planar panel elements which are preferably reinforced. Reinforcement may optionally be provided by the provision of ridges, e.g. parallel linear ridges, disposed about the panel element. The ridges may be pre-formed in a moulding process (e.g. in the case of a plastic material) or added or affixed to the panel as slats (e.g. for a wood-based material). Optionally, reinforcing cross beams may be provided over the slats.

In a preferred embodiment of the invention, where the panels are manufactured from wood-based material, the panels comprises a planar panel element of wood or ply wood, typically of rectangular shape, and a plurality of wooden slats forming ridges disposed across the width of the panel, typically in a parallel arrangement with one or more (typically at least two—one at each edge, and optionally three—the third along the centre) optional wooden cross-beam disposed along the length of the panel element.

Preferably, the panel is formed of plywood (e.g. 5 to 25 mm, preferably 9 mm thick) having wood (e.g. C24 grade timber) slat ridges (e.g. 40 to 80 mm by 80 to 120 mm, preferably 60 to 65 mm by 95 to 105 mm) and wood (e.g. C24 grade timber) cross beams (e.g. 40 to 80 mm by 80 to 120 mm, preferably 60 to 65 mm by 95 to 105 mm).

Preferably, a panel comprises a plywood planar panel (of the sizes discussed above, e.g. 4 m long by 2.25 m high) having disposed transversely across it a plurality of slat ridges, preferably at least 6 and more preferably 8 to 15 and most preferably 10 to 14. Preferably, a cross beam is provided disposed longitudinally along the length of the panel adjacent each end, for example. Optionally, a third or fourth cross beam may be provided disposed equidistantly on the panel. In this case, the number of ridges may be reduced, whilst maintaining the structural performance, e.g. to 4 to 8 and more preferably 5 to 7.

Such reinforced panels are preferable in order to provide the wind (and in particular) hurricane resistance required by these structures assembled from the panels in areas requiring deployment of temporary, intermediate and semi-permanent shelters.

Preferably, each panel has a total thickness of from 3 to 30 cm, more preferably up to 25 cm or 20 cm, still more preferably from 5 to 15 cm, such as 6 to 10 cm (e.g. 6 to 8 cm) and ideally a thickness of about 7 cm.

Preferably, a building according to the present invention when assembled, has a size of from 5 to 30 $m^2$, preferably 15 to 20, e.g. about 16 (ideal for five person unit).

In another (fifth) aspect of the invention, there is provided a shipping container loaded with at least one transportable building system as defined above, preferably at least 5 and more preferably 7 to 10 (e.g. 9). It is a particular advantage of the preferred forms of the present invention that a shipping container of standard (12 m) specification [e.g. 12.050 m×2.350 m×2.400 m internal dimension] can hold 9 of the preferred compact configuration of the building system of the present invention [2.28 m×0.71 m×4 m] which can be assembled as described above to provided a 16.3 $m^2$ building as a temporary shelter to accommodate 5 persons.

I t is thus a further aspect of invention to provide a method of providing relief accommodation to an emergency zone, the method comprising providing a plurality of compact building systems preferably as described in the present application, each building system assemblable to provide an accommodation unit for at least 4 persons, more preferably 5 persons according to Sphere regulations, which building systems are sizes in their compact form for providing at least 5, preferably at least 7 and more preferably 9 or more in a standard shipping container and preferably shipping to the emergency zone for deployment.

In a yet further aspect (and preferred embodiment) of the invention, there is provided a building or building system for relief shelter and optionally configurable between first and second configuration as defined above, the building comprising a structural support configuration comprising a medial structural support panel element (e.g. of I-profile) and a suitably anchored floor panel element extending outward from the base at each side thereof and further comprising an arrangement of panel elements arranged by moveably mounting or hingedly mounting in relation to the structural support configuration to provide the exterior walls and roof (preferably apex roof) of the building. Preferably, a compact form for transport is provided in the manner set out hereinbefore. Preferably, the building according to this aspect is adaptable between a first normal configuration and a second wind-resistant configuration as described hereinbefore in relation to earlier aspects hereinbefore described.

Each panel or component or combination thereof, as defined above, provide further independent aspects of invention.

The invention will now be described in more detail, without limitation, with reference to the accompanying Figures.

Figure 1:
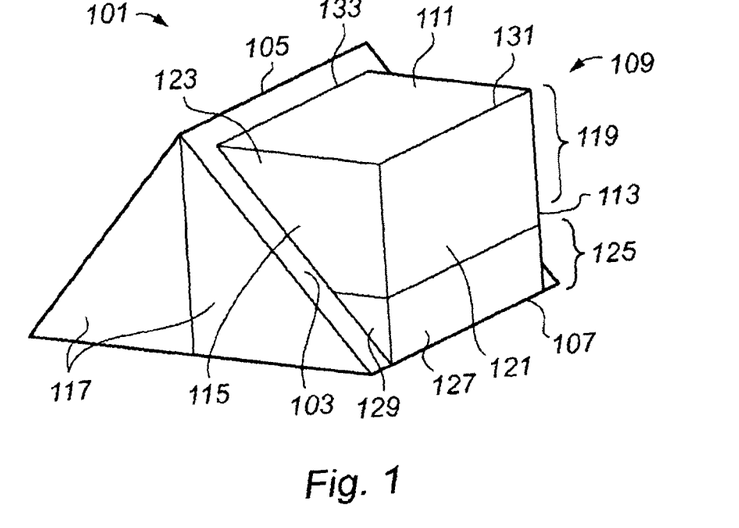
FIG. 1 shows in perspective view an illustration of a building in assembled form and its first configuration according to one embodiment of the invention.

According to FIG. 1, a building 101 according to one embodiment of the present invention in its deployed form and its first, normal, configuration takes the shape of a triangular prism having a sloping roof element 103 extending from the ridge 105 to the sidewall-floor junction 107 and protruding from the sloping roof element 103 a dormer 109. The dormer 109 has a flat roof 111, a vertical front 113 and sides 115. In the dormer front 113, windows (not shown) may be disposed. An entrance door (not shown) to the building 101 may be provided in a gable end panel 117. The dormer 109 is composed of an upper portion 119 comprising the dormer roof 111 and hingedly mounted thereto an upper dormer front element 121 and two upper dormer side elements 123 and a lower portion 125 comprising a lower front element 127 hingedly mounted to the floor at the floor-sidewall junction 107 and comprising lower side elements 129, which may be fixedly or hingedly mounted to the lower front portion 127. Typically the upper and lower portions (119,125) are secured together from the inside and/or outside. Windows (not shown) may be provided, typically, in the upper front portion.

Figure 2:
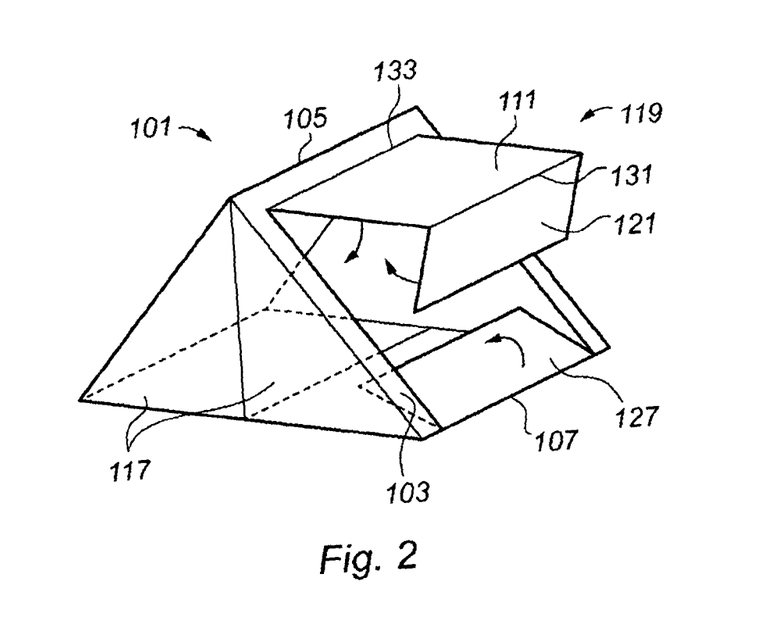
FIG. 2 shows in perspective view a building of FIG. 1 being adapted to its hurricane safe configuration.
Figure 3:
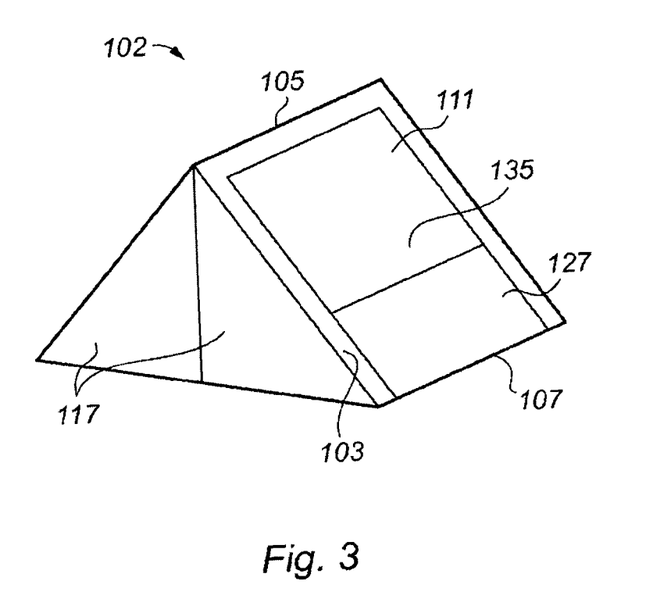
FIG. 3 shows in perspective view a building of FIG. 1 in its hurricane safe configuration.

FIG. 2 illustrates the conversion of the building 101 to its second hurricane-safe mode 102 (FIG. 3). The upper and lower portions (119,125) of the dormer 109 are separated and the lower portion 125 is lowered into the interior of the building so as to make the lower front element 127 flush with the sloping roof element (or frame) 103. The upper front element 121 is folded inward toward the interior of the building about its hinge with the dormer roof 111 (the side elements being folded in under the dormer roof element or removed and stored) and the dormer roof 111 lowered by moving about hinged connection 133 with the roof apex until it becomes flush with the sloping roof element (or frame) 103. Thus, in the second configuration 102, a sloping roof 135 is provided extending from apex 105 to side wall floor junction 107 and comprises a sloping roof element (or frame) 103, an upper roof portion 111 (formed of the dormer roof 111 of the first configuration) and a lower roof portion 127 (formed of the lower dormer front 127 of the first configuration). The upper dormer front 121 becomes a strut (not shown) for supporting the upper roof portion 111 and may rest against a retaining element, e.g. on the interior floor.

Thus, the second configuration 102 is secured as a triangular prism in which the roof portion 135 extends from floor 107 to apex 105 at an angle of approximately 45 degrees.

Figure 4:
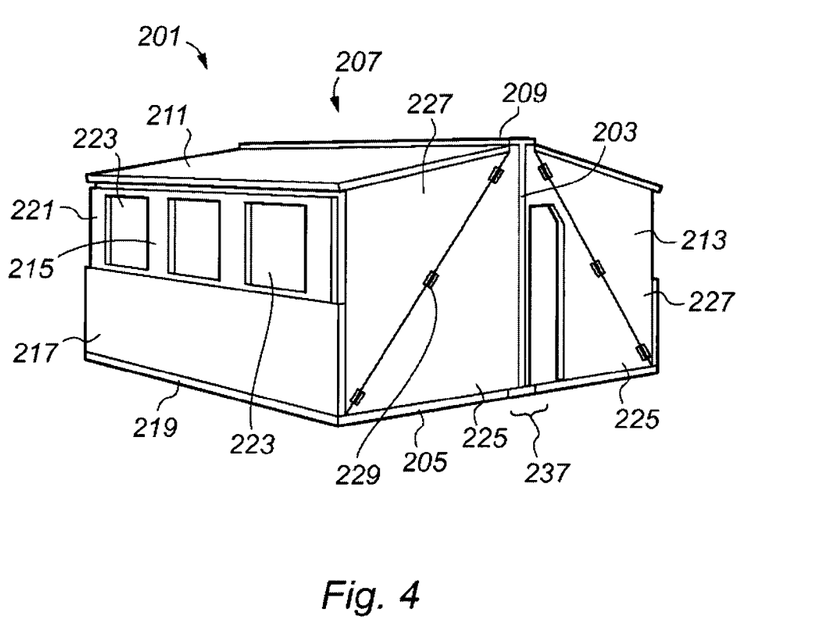
FIG. 4 illustrates in perspective view a building in its assembled form and normal configuration according to another embodiment of the invention.

FIGS. 4 to 8 illustrate a building 200, 201, 202 according to a preferred embodiment of the invention. In FIG. 4 a building 201 in its deployed form and in its first, normal, configuration is shown and comprises a central support frame 203 extending from the floor 205 to the roof 207 and including the apex or ridge 209 of the roof 207 and extending each side from the ridge 209 a roof panel 211, hingedly mounted to the central support frame 203, and sloping downward away from the ridge 209 at an angle of about 10 degrees. The roof panel 211 rests on opposing gable end wall arrangements 213 and a side wall panel arrangement 215. The side wall 215 comprises a lower side wall element 217 which is hingedly mounted at the side wall-floor junction 219 to the floor 205 and has hingedly mounted thereon an upper side wall element 221 which has three windows 223 formed therein. The gable end wall arrangement 213 comprises an inner portion 225 disposed between the central frame post 203 and the floor 205 and generally of triangular shape extending from ridge 209 to side wall floor junction 219 and an extended leaf portion 227 which is hingedly mounted thereto.

Figure 5:
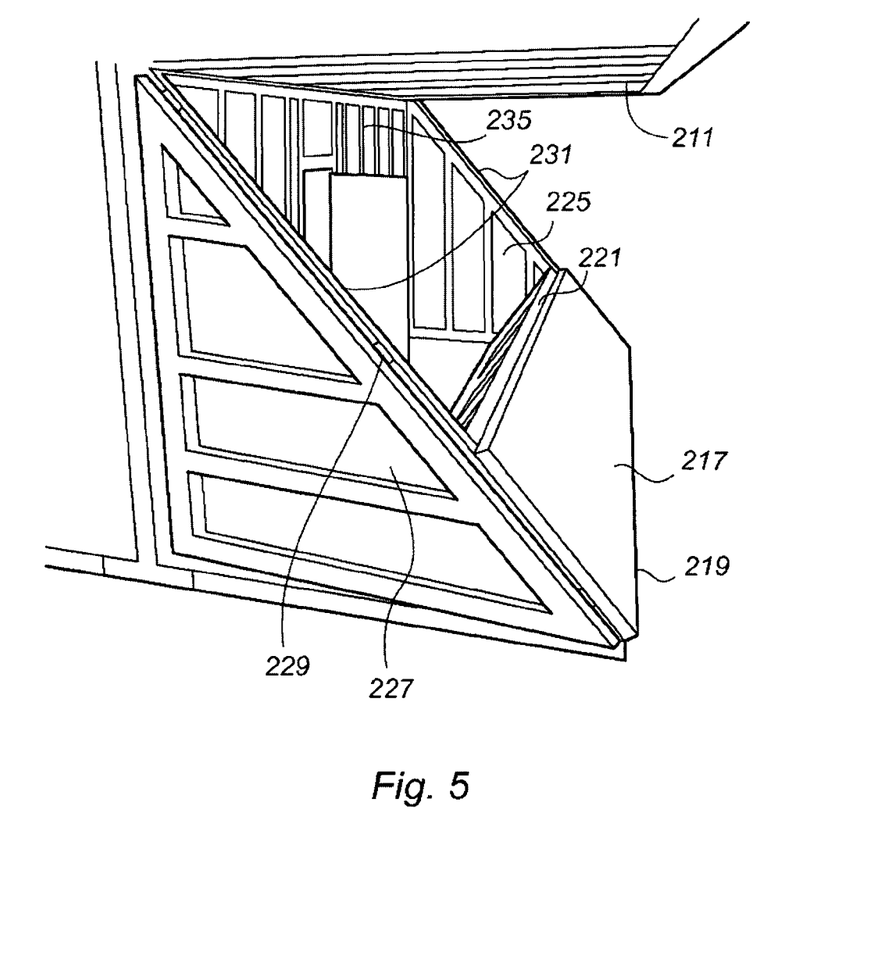
FIG. 5 illustrates in perspective view a building of FIG. 4 being adapted to its hurricane safe configuration.
Figure 6:
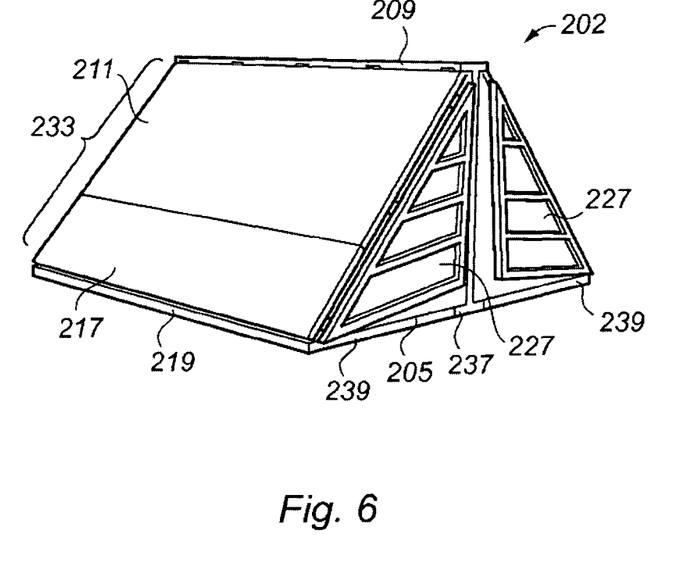
FIG. 6 illustrates in perspective view a building of FIG. 4 in its hurricane-safe configuration.
Figure 7:
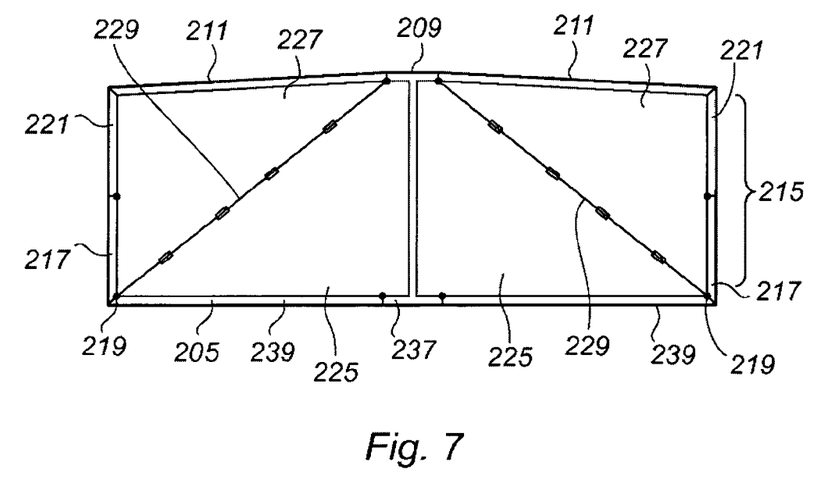
FIG. 7 is a cross-sectional representation of a building of FIG. 4.

To convert the building 201 to its second configuration 202, the roof panel 211 may be first pivoted upwards about its hinge mounting to the ridge 209. The extended leaf portion 227 of the gable end wall arrangement 213 may be moved out of the way either by folding outward about its hinged mounting 229 with the inner portion 225 or disengaged therefrom and stored. The upper side wall element 221 may be folded inward (into the building) about its hinge mounting with the lower side wall element 217 which itself may be folded inward (toward the interior of the building). The roof panel 211 may then be pivoted downward until it comes to rest on the exposed edge 231 of the inner portion of the gable end wall so that it lies flush with the lower side wall element 217. The upper side wall element 221 provides a truss for the roof panel 221 and lower side wall element 217 of the first configuration which together form an extended roof 233 (or composite roof-wall arrangement) in the second configuration.

The extended leaf portions 227 of the gable end wall arrangements 213 may be secured against the gable end of the building 202 in its second configuration or detached and stored.

Preferably, according to this embodiment, the central support frame 203 includes a partition wall 235 separating the interior space into two living units, typically separated by a door or door space provided in the partition wall 235.

Figure 8:
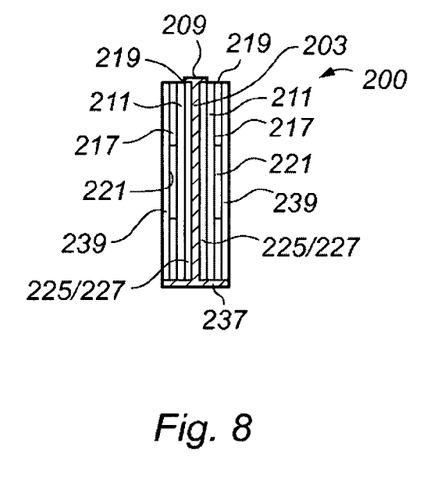
FIG. 8 illustrates in end view a building of FIG. 4 in its compact form.

Preferably, the building 201,202 according to this embodiment may be assembled from (and collapsible to) a compact form 200 for storage and transport. FIG. 8 illustrates the compact disassembled form of the building 200. According to this embodiment, with reference to the building 201 in its assembled form in its first configuration, a central support element 203 comprises an I-frame cross-section and extending the full height from floor 205 to apex 209 and length of the building 201 from gable 213 to gable 213. The central support element 203 comprises a base element 237 forming a part of the floor 205 and extending gable 213 to gable 213, a ridge element 209 which forms the ridge 209 of the building 201,202 and extending gable 213 to gable 213 and a central reinforced sheet element 235 therebetween which also extends gable to gable and which defines gable edges forming part of or to which are mounted gable ends of the building. This is the core element of the building and provides the cores structural integrity. Hingedly mounted to the base element are two outwardly extending floor panels 239. The floor panels 239 have at or close to their extreme edge hingedly mounted thereto respective lower side wall panels 217 which in turn have hingedly mounted respective upper side wall panels 221. Hingedly mounted to or in relation to the ridge element 209 are two outwardly extending roof panels 211. A gable wall arrangement 213, as defined above is hingedly mounted to or in association with the gable edge of the central reinforced sheet element 203.

To move from assembled 201 to compact form 200, each gable end wall arrangement 213 may be pivoted inwards to stand adjacent the central reinforced sheet element 235 (partition wall), the side walls 215 may be folded down flat onto the floor panels 239, the roof panel 211 may be lowered about its hinge mount to lie adjacent the gable wall arrangements 213 and the floor panels 239 (with side walls 215 lying on them) may be lifted upwards about their hinged mounts to the base element 237 of the central support element 203 so that the side walls 215 abut the roof panels 211. Thus a compact form 200 may be achieved.

The invention has been described with reference to a preferred embodiment. However, it will be appreciated that variations and modifications can be effected by a person of ordinary skill in the art without departing from the scope of the invention.

The invention claimed is:

1. A building that is adaptable between a first normal configuration and a second wind-resistant configuration by relative movement of at least two space enclosing elements of the building, wherein the first configuration defines a first internal volume and the second configuration defines a second internal volume less than the first internal volume, wherein the first configuration comprises:
a first roof element moveable relative to at least one structurally supporting part of the building, said first roof element being one of the at least two space enclosing elements and which in the first configuration has a first roof angle to the horizontal; and
an adjacent first side wall element being one of the at least two space enclosing elements, at least a portion of which is moveable relative to at least one structurally supporting part of the building, said first side wall element in the first configuration having a first side wall angle to the horizontal; and
wherein the second configuration comprises a composite roof-wall arrangement having a roof component derived from at least a portion of the first roof element and a side wall component derived from at least a portion of the first side wall element, wherein the angle to the horizontal of each of the roof component and the wall component of the composite roof-wall arrangement in the second configuration are intermediate between the first roof angle of the first roof element in the first configuration and the first wall angle of the first wall element of the first configuration.

2. The building as claimed in claim 1, wherein at least a portion of each of the at least two space enclosing elements of the building are space enclosing in each of the first and second configurations.

3. The building as claimed in claim 1 or claim 2, in which the second configuration is for providing protection against high winds.

4. The building as claimed in claim 1 wherein, in the second configuration, the at least a portion of an element derived from the first roof element of the first configuration has an angle to the horizontal of greater than the first roof angle.

5. The building as claimed in claim 1, wherein first roof angle is in the range 0 to 30 degrees from the horizontal.

6. The building as claimed in claim 1, wherein the first wall angle is in the range 60 to 90 degrees from the horizontal.

7. The building as claimed in claim 1, wherein the angle to the horizontal of each of the roof component and wall component of the composite roof-wall arrangement is independently in the range 30 to 60 degrees from the horizontal.

8. The building as claimed in claim 1, wherein the relative movement of the first roof element and the first side wall element is facilitated by hinged mounting of the first roof element and the first side wall element on the building.

9. The building as claimed in claim 1 which is of quadrangular plan and comprises an apex roof, said apex roof being supported by a rigid medial support element.

10. The building as claimed in claim 8, wherein the first roof element is hingedly mounted to an apex of the apex roof and the first side wall element is hingedly mounted to the floor.

11. The building as claimed in claim 10, wherein the first side wall element comprises a lower side wall element that is hingedly mounted to the floor and an upper side wall element that is hingedly mounted to the lower side wall element and is configured to be able to fold into the interior of the building, whilst the lower side wall element is configured to fold inward toward the interior of the building so as to form the composite roof-wall element comprising the lower side wall element and the roof element.

12. The building as claimed in claim 1 which comprises a quadrangular plan, and in the first configuration a floor, an apex roof, two opposing gable wall arrangements, two opposing side wall arrangements and rigid medial support element extending from gable to gable and supporting the apex roof.

13. The building as claimed in claim 12, wherein each of the apex roof, floor, gable wall arrangements, side wall arrangements comprises one or more panel elements.

14. The building as claimed in claim 12, wherein the medial support element, comprises a partition wall to define two accommodation units within the building.

15. The building as claimed in claim 12, wherein:
the apex roof comprises a ridge defining the apex which is substantially parallel with the side walls and supported by the medial support element;
two roof panels each hingedly mounted to and extending from each respective side of the ridge to rest interoperatively with the side walls;
each side wall comprises a lower side wall element hingedly mounted to the floor and an upper side wall element hingedly mounted to the lower side wall element;
each gable wall arrangement comprises a first gable end wall inner portion disposed between the medial support element and the floor and an extended leaf portion hingedly or removably mounted to the first gable end wall inner portion and disposed between the roof panel and the side wall; and
wherein the building may be adapted from its first to its second configuration by disengaging the roof panel from the upper side wall element, folding away or removing the extended leaf portion of the gable wall arrangement, folding into the interior of the building the upper side wall element to abut the floor or other retention means so as to form a truss, pivoting toward the interior of the building the lower side wall element about its hinged mount to define an angle intermediate between the first roof angle and the first wall angle and pivoting the roof panel about its hinged mount inward toward the interior of the building so as to adopt an angle intermediate between the first roof angle and the first wall angle and engage or abut interoperatively with the lower side wall element to form the composite roof-wall arrangement and securing in position.

16. The building as claimed in claim 1, which has an internal floor area in the range 12 to 25 m$^2$.

* * * * *